United States Patent
Hartline, Jr.

[15] 3,662,819
[45] May 16, 1972

[54] FLUID TEMPERATURE CONTROLLER

[72] Inventor: Rolland L. Hartline, Jr., Buchanan, Mich.
[73] Assignee: Clark Equipment Company
[22] Filed: Oct. 9, 1970
[21] Appl. No.: 79,417

[52] U.S. Cl. ................................................. 165/26
[51] Int. Cl. ........................................... F25b 29/00
[58] Field of Search .......................... 165/26, 35–40

*Primary Examiner*—Charles Sukalo
*Attorney*—Kenneth C. Witt, John C. Wiessler, Robert H. Johnson and Lewis J. Lamm

[57] ABSTRACT

Apparatus for controlling the operating fluid temperature in a closed fluid circuit including a torque converter and a heat exchanger in which the heat generated in the torque converter fluid varies widely and in which part of the fluid bypasses the heat exchanger. An electrical signal is generated whose amplitude is dependent on the temperature of the fluid leaving the heat exchanger which signal is modified to reflect the rate of change of this temperature. A second signal is generated, the amplitude of which is dependent on the temperature of the fluid bypassing the heat exchanger and this signal is modified to reflect the percentage of the fluid bypassing the heat exchanger. These signals are combined and the resulting signal is compared at preselected intervals to a standard signal representing the desired fluid temperature to control the coolant flow through the heat exchanger.

10 Claims, 2 Drawing Figures

INVENTOR
ROLLAND L. HARTLAND, JR.

BY
Lewis J. Lamm

ATTORNEY

3,662,819

FLUID TEMPERATURE CONTROLLER

BACKGROUND OF THE INVENTION

The present invention relates to fluid temperature control devices and particularly to devices for controlling the volume of coolant flowing through a heat exchanger in a torque converter or other similar fluid energy circuit.

This invention also relates to controls for heat exchangers used in circuits where the fluid temperature involved varies widely at the heat exchanger inlet.

Previous coolant control devices for heat exchangers with a widely fluctuating operating fluid inlet temperature have tended to over control the flow of coolant and thus produce an undulating temperature at the operating fluid outlet of the heat exchange device.

The present invention includes an improvement in fluid temperature automatic controls which include means for anticipating temperature changes and thereby avoids this undulating temperature variation or hunting characteristic found in previous devices.

The present invention also includes means for compensating for fluid volume bypassing the heat exchanger to thus modify the control of flow of the coolant fluid.

It also contains means for sampling at preselected time intervals operating fluid temperatures and comparing an electrical signal dependent on these temperatures with a standard signal to thereby accurately control the temperature of the circulating fluid.

SUMMARY OF THE INVENTION

The apparatus which is the subject of the present invention is adapted to control the temperature of oil in a torque converter transmission circuit having widely varying loads and having a fluid leakage circuit which bypasses the oil cooler. It includes an electrical signal means for anticipating oil temperature changes, a signal output modifying circuit for compensating for the oil bypassing the oil cooler, a standard signal generator representing the desired temperature of the hydraulic oil, and means for combining these signals to produce a combined oil temperature signal and compare this last signal with a standard temperature signal and thus control the coolant flow through the heat exchanger.

It is an object of the present invention to provide an accurate fluid temperature controller which will anticipate fluid temperature changes, and take sampling at predetermined times to allow for temperature correction between sampling.

It is an object of the present invention to provide a temperature controller which may be adjusted for various volumes of fluid flowing through the heat exchanger and still obtain proper control.

It is a further object of the present invention to provide a versatile electronic fluid temperature control apparatus giving better temperature regulation than was previously available.

Other objects of the present invention will become apparent on study of the specification and drawings and will be specifically claimed in the claims.

DESCRIPTION OF PREFERRED EMBODIMENT

Figure 1:
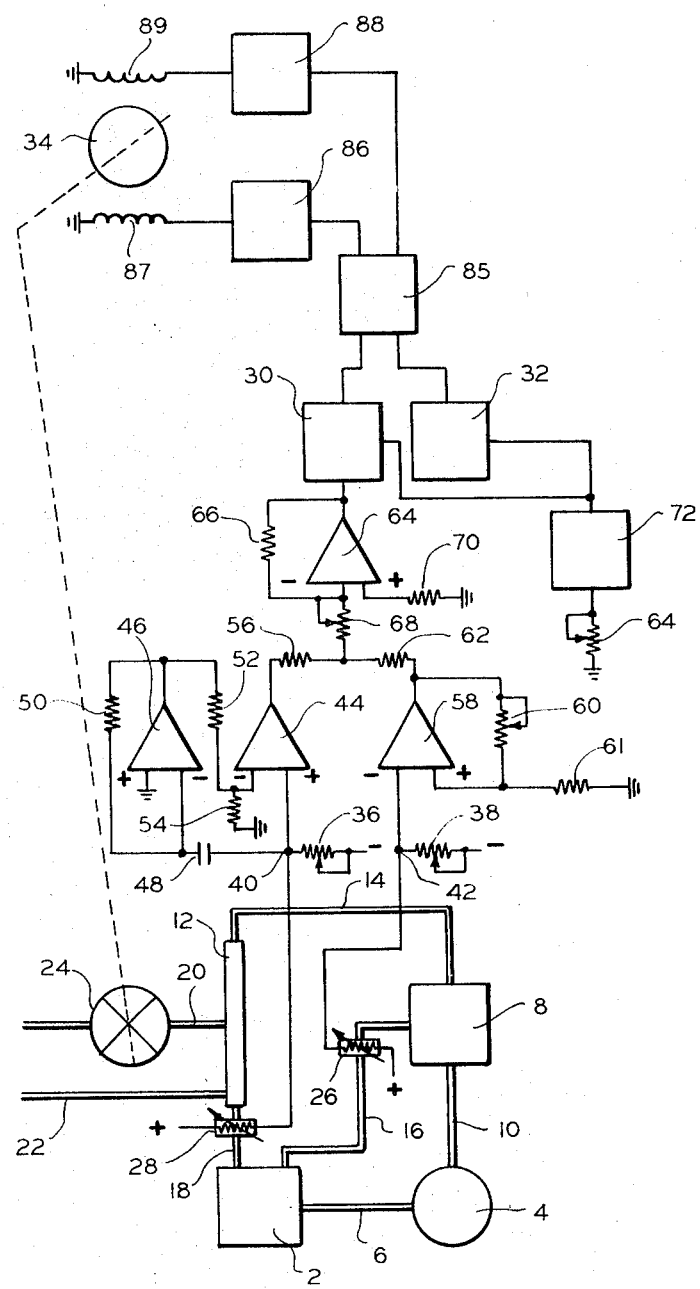
Referring to FIG. 1, a fluid circulating system is shown as an oil system having a sump 2 connected to a pump 4 by a conduit 6 and the pump is connected to a hydraulic torque converter or other fluid heating device 8 by a fluid conduit 10. The torque converter 8 is connected to the heat exchanger 12 by conduit 14 and to the sump 2 by conduit 16. The heat exchanger 12 has a coolant inlet 20, an outlet 22 through which the coolant flow is controlled by a fluid source control or valve 24. This source control or valve 24 is actuated in response to an electrical circuit which includes heat sensors 26 and 28 located in the fluid bypass 16 and in the fluid conduit 18, respectively. The output from these sensors are electrical signals which are combined and modified in an electrical circuit to produce signal at the one shot square wave generator 30. The length of the square wave is a function of the amplitude of the signal which the generator receives. The output signal of generator 30 is compared with a standard length square wave signal from one shot square wave generator 32 to energize motor 34 and thereby cause it to actuate the valve 24. Thus the valve 24 is operated in response to the temperature in the conduit 16 and that in the conduit 18 to control the temperature of the fluid in the sump 2 by controlling the volume of cooling fluid (here illustrated as water at a constant temperature less 200° F.) flowing through the heat exchanger 12.

Referring to FIG. 1 in the drawing, a description of the preferred specific embodiment of the invention is described as follows.

The oil sump 2 is a reservoir for hydraulic fluid for the torque converter circuit. It is desired to maintain the temperature of the hydraulic fluid in this reservoir to 200° F. plus or minus 2°. The oil pump 4 has a capacity of 10 gallons per minute to 100 gallons per minute in this specific embodiment and the fluid is pumped through circuit 10 to the heat producing mechanism 8 which may be a transmission having a torque converter. Part of the oil pumped through 10 is required by the device 8 for controls and designed leakage. This leakage rate which flows back to the sump 2 through conduit 16 varies from 5 to 10 percent of the total oil pumped through 10. This oil as well as the remaining 95 to 100 percent pumped to the heat exchanger 12 through 14 is heated considerably by the transmission 8. The temperature range of this output oil varies from room temperature to a temperature of 350° F. which temperature is reached when considerable work is absorbed by the fluid, such as under stalled torque converter conditions. The temperature drop of the fluid flowing from 14 to 18 through heat exchanger 12 varies with flow rate, temperature difference between the circulating fluid and the coolant fluid and with the rate of flow of the coolant as permitted by the valve 24 in line 20. In order to maintain the temperature of the oil in the sump 2 at 200° F. the temperature of the oil in the line 18 must be sufficiently under that to compensate for the hot oil coming through 16. Also, temperature changes in the conduit 18 must be anticipated in order to avoid over controlling.

Referring to the electrical circuit in the drawing, heat sensors 26 and 28 are identical and are the type that change their electrical resistance with change of temperature. These sensors are located in the conduits 16 and 18 respectively. Variable resistor 36 is connected to the sensor 28 at the junction 40 with the opposite side of the sensor 28 being connected to a DC positive source and one end of the resistor 36 is connected to a negative DC source. 36 is then adjusted so that the voltage at 40 is zero when the fluid is at the desired temperature. The point 40 goes positive as the temperature sensed by the sensor 28 goes above the desired temperature (in this specific instance, 200° F.). Referring to sensor 26, this sensor is connected to the variable resistance 38 at the point 42. Sensor 26 has the same relationship with 38 as 28 has with 36 so that at desired temperature, the resistance 38 is adjusted so the voltage at 42 is zero. As the temperature being sensed by 26 goes above the desired temperature, the point 42 goes positive. Thus, the heat sensors 26 and 28 (thermistors) vary in resistance with varying temperature to vary the voltages at 40 and 42 directly with temperature change of the fluid in conduits 18 and 16 respectively. The voltage at 40 is fed to amplifiers 44 and 46 simultaneously. The amplifier 46, together with condenser 48 and resistor 50, form an integrating circuit whose output through 44 and across resistors 52 and 54 varies as a function of the rate of change of temperature in the conduit 18 as measured by the thermistor 28. This signal anticipates the need for adjustment of valve 24 depending upon temperature rate of change of the output of the heat exchanger. The signal at point 40 which is a direct function of temperature of the fluid in conduit 18 is fed into the amplifier 44 with the signal from the integrating circuit. The output of this amplifier 44 is, therefore, a function of actual temperature plus a function of rate of change of temperature of fluid in conduit 18.

The signal at point 42, which is a function of the actual temperature of the fluid in conduit 16, is fed into the amplifier 58. The feedback circuit including variable resistor 60 and fixed resistor 61 form a circuit for compensating for the flow of leakage fluid through the conduit 16. The amount of leakage is measured and the resistor 60 adjusted to the desired compensating value. This adjustment is to assure that the mixture of hot oil through 16 with the cooler oil from conduit 18 will result in the proper temperature oil at the sump 2. The combined outputs of the amplifiers 44 and 58 are fed through resistors 56 and 62 to the summing amplifier 64. The input to this amplifier is zero if the temperature at conduit 18 and 16 is such as to maintain the temperature of the oil in the sump 2 at the desired temperature (200° F.).

The feedback circuit 66 and 68, plus resistor 70, is adjusted by adjusting resistor 68 for the different size of flow of fluid to the system. This controls the gain of the amplifier so that the proper coolant volumes are admitted to the heat exchangers for hot oil values of 10 to 50 gallons per minute. The output of the amplifier 64 is zero if the fluid temperatures are such as to maintain the temperature of the oil in the sump 2 at the desired temperature. Rate of sample oscillator 72 is adjusted by adjusting the resistor 64 so as to produce trigger pulses at pulse repetition frequencies of from 5 to 25 seconds. It has been found that adjusting 64 to produce a pulse repetition frequency of 11 seconds is satisfactory in one particular installation. In that particular installation, the heat exchanger had a delay time of approximately 11 seconds. That is, it takes the operating oil 11 seconds to travel the complete fluid circuit.

30 is a voltage controlled one shot square wave producing oscillator. The length of the wave produced may vary from 1.5 seconds for zero input to 0.5 second for maximum negative input to 2.5 seconds for maximum amplitude signal input. 32 is a one shot square wave producing oscillator having a fixed 0.5 second square wave output. Both oscillators 30 and 32 are simultaneously triggered by the output pulse from 72. Both start simultaneously to form pulses. The pulse from 30 may vary from 0.5 of a second (see 82 in FIG. 2) to 2.5 seconds (see 84 in FIG. 2). The pulse from 32 starts the same time as the pulse from 30, but is fixed at 1.5 seconds (see 80 in FIG. 2). 85 is a pulse width error detector that energizes servo systems 86 and 88 to cause power to flow through motor windings 87 and 89 respectively, to thus rotate the armature 34 and operate the valve 24 on the heat exchanger 12. If the pulse width of the signal from 30 is less than that from 32 (1.5 seconds), then the pulse width error detector 85 energizes the servo circuit 88 to cause current flow in the winding 89 and thus actuate the armature 34 to close the valve 24. If this pulse width of the signal from 30 is greater than that from 32 (1.5 seconds), then the pulse width error detector energizes the servo 86 to cause current flow in the winding 87 and thus actuate the armature 34 to open the valve 24.

Figure 2:
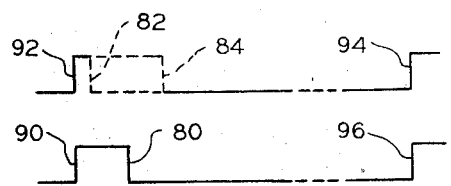

Referring to FIG. 2, the pulse from 32 starts at 90 and ends at 80 and then is energized again 5 to 25 seconds (normally 11 seconds) later at 96. The distance from 90 to 80 is 1.5 seconds. The signal generated at 30 is triggered at 92 and the pulse length varies from 82 (0.5 second) to 84 (2.5 seconds) and then is triggered again 5 to 25 seconds later (simultaneously with 32) at 94 (simultaneous to 90).

It may, therefore, be seen that the amount of coolant admitted through valve 24 (or other variable source) is a direct function of the length of the pulse produced by the signal generator 30 which, in turn, is a function of actual temperatures and rates of temperature change in the conduits 16 and 18.

Having thus described my invention in one embodiment thereof, it is obvious that it may be utilized in other temperature controlling environments without departing from the scope of the appended claims.

What is claimed is:

1. A fluid temperature control device for controlling the temperature of an operating fluid in a circulating system which system includes a sump, pump, a fluid heating mechanism, and a heat exchanger; having operating fluid circulating connections between said sump and said pump, between said pump and said fluid heating mechanism, between fluid heating mechanism and said sump, between said fluid heating mechanism and said heat exchanger, and between said heat exchanger and said sump; in which system the volume of operating fluid flowing from said heating mechanism to said heat exchanger is several times that flowing from said heating mechanism to said sump, in which said heat exchanger has a source of substantially constant temperature coolant fluid capable of regulating the temperature of said operating fluid, and in which the means for controlling the fluid flow from the source of coolant fluid comprises; an electrical signal source responsive to the temperature of said operating fluid flowing from said heating mechanism, a second electrical signal source responsive to the temperature of the operating fluid going from said heat exchanger, means for modifying the signal from said second electrical signal source in response to rate of change of said last mentioned temperature, means for modifying the signal from one of said electrical signal sources to compensate for the difference in volume of operating fluid flowing from said fluid heating mechanism to said heat exchanger and that operating fluid flowing from said heating mechanism to said sump, means for combining said signals, means for producing a standard electrical signal representing the desired sump temperature of said circulating fluid and means for comparing said combined signal with said standard signal and using the difference between said signals to control the flow of coolant through said heat exchanger.

2. A fluid temperature control device as claimed in claim 1 in which the operating fluid is a liquid and the fluid heating mechanism is a transmission in which said liquid is used to transmit power.

3. A fluid temperature control device as claimed in claim 1 in which both electrical signal sources responsive to the temperature of the fluid produce direct current electrical signals.

4. A fluid temperature control device as claimed in claim 1 in which the means for controlling the flow of coolant to said heat exchanger includes an electrical power source controlled by the signal resulting from the pairing of said combined signal with said standard signal and using said electrical power source to control the fluid flow rate through said heat exchanger.

5. A fluid temperature control device as claimed in claim 1 in which the operating fluid is a liquid subjected to varying amounts of heat energy and said source of coolant fluid is a source of substantially constant temperature liquid.

6. A fluid temperature control device as claimed in claim 1 in which the standard electrical signal is produced at time intervals substantially equal to the time interval required for said operating fluid to make one complete circuit of the fluid circulating system.

7. A fluid temperature control device as claimed in claim 1 in which the means for controlling the source of coolant fluid comprises a direct current electrical signal source having signal amplitude response varying directly with the temperature of said operating fluid flowing from the heating mechanism, a second direct current electrical source having a signal amplitude response varying directly with the temperature of the fluid flowing from said heat exchanger, an electrical signal integrating circuit for modifying the amplitude of the signal from said second electrical source to compensate for its rate of change in amplitude, means for modifying the amplitude of the signal from one of said electrical signal sources to compensate for the difference in volume of fluid flowing from said heating mechanism to said heat exchanger, and that flowing from said heating mechanism to said sump, means for combining said signals, means for producing at a rate substantially equal to the circulatory rate of said operating fluid, a square wave electrical signal, its length varying directly with the amplitude of said combined signals, and simultaneously producing a standard square wave electrical signal its length representing a desired sump temperature of said circulating fluid and comparison means for electrically comparing the length of said square waves, and means for using the output of said comparison means to control the flow of coolant fluid into said heat exchange means and thereby bring the temperature of the operating fluid in said sump to the desired operating temperature.

8. A fluid temperature control device as claimed in claim 1 in which the amplitude of said combined signal is modified in direct proportion to a function of the total operating fluid flow rate through the fluid circulating system.

9. A fluid temperature control device as claimed in claim 2 in which the transmission includes a hydraulic torque converter subject to widely varying power conditions.

10. A fluid temperature control device as claimed in claim 8 in which the amplitude of said combined signal is modified in direct proportion to a function of the total operating fluid flow rate through the fluid circulating system.

* * * * *